(12) United States Patent
Hisano

(10) Patent No.: US 11,429,206 B2
(45) Date of Patent: Aug. 30, 2022

(54) SENSOR CONTROLLER, ACTIVE PEN, AND COMMUNICATION METHOD

(71) Applicant: Wacom Co., Ltd., Saitama (JP)

(72) Inventor: Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/111,243

(22) Filed: Dec. 3, 2020

(65) Prior Publication Data

US 2021/0089141 A1    Mar. 25, 2021

Related U.S. Application Data

(63) Continuation of application No. PCT/JP2019/027826, filed on Jul. 13, 2019.

(30) Foreign Application Priority Data

Jul. 18, 2018  (JP) .............................. JP2018-135288

(51) Int. Cl.
*G06F 3/03*    (2006.01)
*G06F 3/0354*    (2013.01)
(Continued)

(52) U.S. Cl.
CPC ........ *G06F 3/03545* (2013.01); *G06F 3/0317* (2013.01); *G06F 3/03546* (2013.01);
(Continued)

(58) Field of Classification Search
CPC . G06F 3/03; G06F 3/017; G06F 3/041; G06F 1/1652; G06F 3/011; G06F 3/046;
(Continued)

(56) References Cited

U.S. PATENT DOCUMENTS 10,613,651 B2 * 4/2020 Fleck ..................... G06F 9/4411
10,719,142 B2 * 7/2020 Kaplan ............... G06F 3/03545
(Continued)

FOREIGN PATENT DOCUMENTS

JP    2011-18090 A    1/2011
WO    2016/139861 A1    9/2016

OTHER PUBLICATIONS

International Search Report, dated Oct. 21, 2019, for International Application No. PCT/JP2019/027826, 4 pages.

*Primary Examiner* — Olga V Merkoulova
(74) *Attorney, Agent, or Firm* — Seed IP Law Group LLP

(57) ABSTRACT

A sensor controller, which is connected to sensor electrodes and detects positions of one or more active pens based on charge induced on the sensor electrodes, includes a processor and a memory. The memory stores instructions that, when executed by the processor, cause the sensor controller to: detect an approach of one of the one or more active pens using the sensor electrode; pair with the one of the one or more active pens with the approach of the one of the one or more active pens detected and update pairing state information indicative of a pairing state of each of the one or more active pens that is paired with the sensor controller; and transmit the pairing state information from the sensor electrodes to the one or more active pens via an uplink signal used as a reference for time synchronization.

10 Claims, 9 Drawing Sheets

(51) Int. Cl.
*G06F 3/044* (2006.01)
*G06F 3/041* (2006.01)

(52) U.S. Cl.
CPC .......... *G06F 3/0441* (2019.05); *G06F 3/0446* (2019.05); *G06F 3/04162* (2019.05); *G06F 3/04164* (2019.05); *G06F 2203/04101* (2013.01); *G06F 2203/04104* (2013.01)

(58) Field of Classification Search
CPC .... G06F 3/04162; G06F 3/044; G06F 3/0441; G06F 3/0487; G06F 3/038
See application file for complete search history.

(56) References Cited

U.S. PATENT DOCUMENTS

| | | | |
|---|---|---|---|
| 10,732,735 B2* | 8/2020 | Hara | G06F 3/0412 |
| 10,877,578 B2* | 12/2020 | Hisano | G06F 3/0317 |
| 2010/0156831 A1* | 6/2010 | Doubrava | G06F 3/046 345/173 |
| 2011/0007037 A1* | 1/2011 | Ogawa | G06F 3/045 345/179 |
| 2014/0253469 A1 | 9/2014 | Hicks et al. | |
| 2015/0253834 A1* | 9/2015 | Park | G09G 5/00 345/211 |
| 2016/0246390 A1* | 8/2016 | Lukanc | G06F 3/04162 |
| 2017/0060274 A1* | 3/2017 | Watanabe | G06F 3/0412 |
| 2017/0249029 A1 | 8/2017 | Watanabe | |
| 2019/0121453 A1* | 4/2019 | Dekel | G06F 3/03545 |
| 2019/0179429 A1* | 6/2019 | Yamamoto | G06F 3/0383 |
| 2019/0179431 A1 | 6/2019 | Klein et al. | |
| 2020/0026369 A1* | 1/2020 | Hisano | G06F 3/04162 |

* cited by examiner

FIG. 5A
UPLINK SIGNAL (TYPE 1)

| US TYPE FLAG 1 | FRAME STRUCTURE INFORMATION | COMMUNICATION CONFIGURATION DATA | | | | | | | |
|---|---|---|---|---|---|---|---|---|---|
| | | PAIRING ENABLE/ DISABLE FLAG | \multicolumn{7}{c|}{PAIRING STATE INFORMATION} |
| | | | LPID 1 PAIRING FLAG | LPID 2 PAIRING FLAG | LPID 3 PAIRING FLAG | LPID 4 PAIRING FLAG | LPID 5 PAIRING FLAG | LPID 6 PAIRING FLAG | |
| 0 | | 1 | 0 | 0 | 0 | 0 | 0 | 0 | |

FIG. 5B
UPLINK SIGNAL (TYPE 2)

| US TYPE FLAG 1 | US TYPE FLAG 2 | PAIRING TARGET ACTIVE PEN INFORMATION | | | | | |
|---|---|---|---|---|---|---|---|
| | | LPID 1 PAIRING FLAG | LPID 2 PAIRING FLAG | LPID 3 PAIRING FLAG | LPID 4 PAIRING FLAG | LPID 5 PAIRING FLAG | LPID 6 PAIRING FLAG |
| 1 | 0 | 1 | 0 | 0 | 0 | 0 | 0 |

FIG. 5C
UPLINK SIGNAL (TYPE 3)

| US TYPE FLAG 1 | US TYPE FLAG 2 | COMMAND (INCLUDING LPID) | | | | | |
|---|---|---|---|---|---|---|---|
| | | LPID 1 PAIRING FLAG | LPID 2 PAIRING FLAG | LPID 3 PAIRING FLAG | LPID 4 PAIRING FLAG | LPID 5 PAIRING FLAG | LPID 6 PAIRING FLAG |
| 1 | 1 | 1 | 0 | 0 | 0 | 0 | 0 |

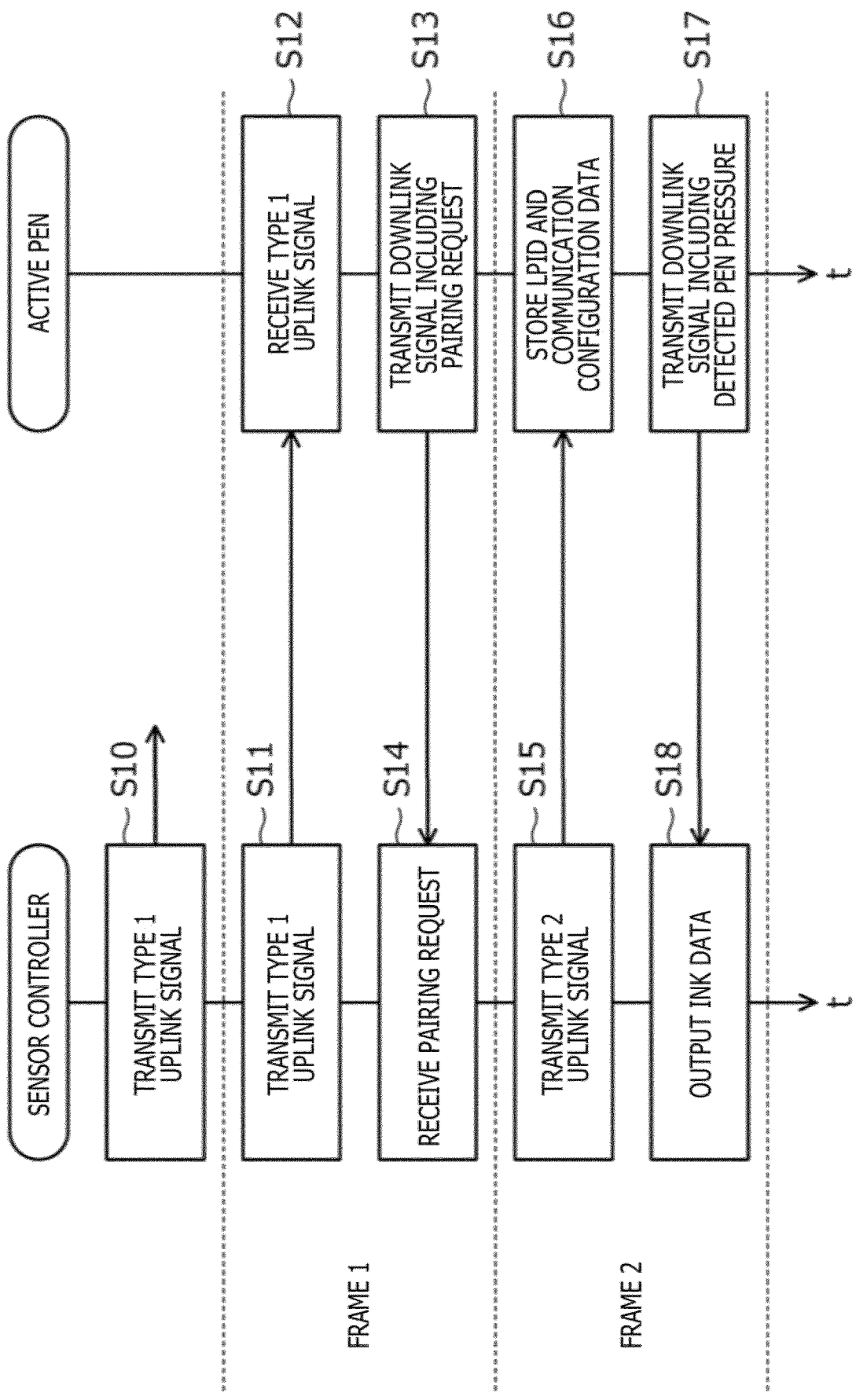

FIG. 9A
UPLINK SIGNAL (TYPE 1)

| US TYPE FLAG 1 | FRAME STRUCTURE INFORMATION | COMMUNICATION CONFIGURATION DATA | | | | | | | |
|---|---|---|---|---|---|---|---|---|---|
| | | PAIRING ENABLE/DISABLE FLAG | PAIRING STATE INFORMATION | | | | | | |
| | | | LPID 1 PARING FLAG | LPID 2 PARING FLAG | LPID 3 PARING FLAG | LPID 4 PARING FLAG | LPID 5 PARING FLAG | LPID 6 PARING FLAG | |
| 0 | | 1 | 0 | 0 | 0 | 0 | 0 | 0 | |

FIG. 9B
UPLINK SIGNAL (TYPE 2)

| US TYPE FLAG 1 | US TYPE FLAG 2 | PARING TARGET ACTIVE PEN INFORMATION | | | | | |
|---|---|---|---|---|---|---|---|
| | | LPID 1 PARING FLAG | LPID 2 PARING FLAG | LPID 3 PARING FLAG | LPID 4 PARING FLAG | LPID 5 PARING FLAG | LPID 6 PARING FLAG |
| 1 | 0 | 1 | 0 | 0 | 0 | 0 | 0 |

FIG. 9C
UPLINK SIGNAL (TYPE 3)

| US TYPE FLAG 1 | US TYPE FLAG 2 | COMMAND (INCLUDING LPID) | | | | | | |
|---|---|---|---|---|---|---|---|---|
| | | DATA TYPE FLAG | PAIRING STATE INFORMATION | | | | | |
| | | | LPID 1 PARING FLAG | LPID 2 PARING FLAG | LPID 3 PARING FLAG | LPID 4 PARING FLAG | LPID 5 PARING FLAG | LPID 6 PARING FLAG |
| 1 | 1 | 0/1 | 1 | 0 | 0 | 0 | 0 | 0 |

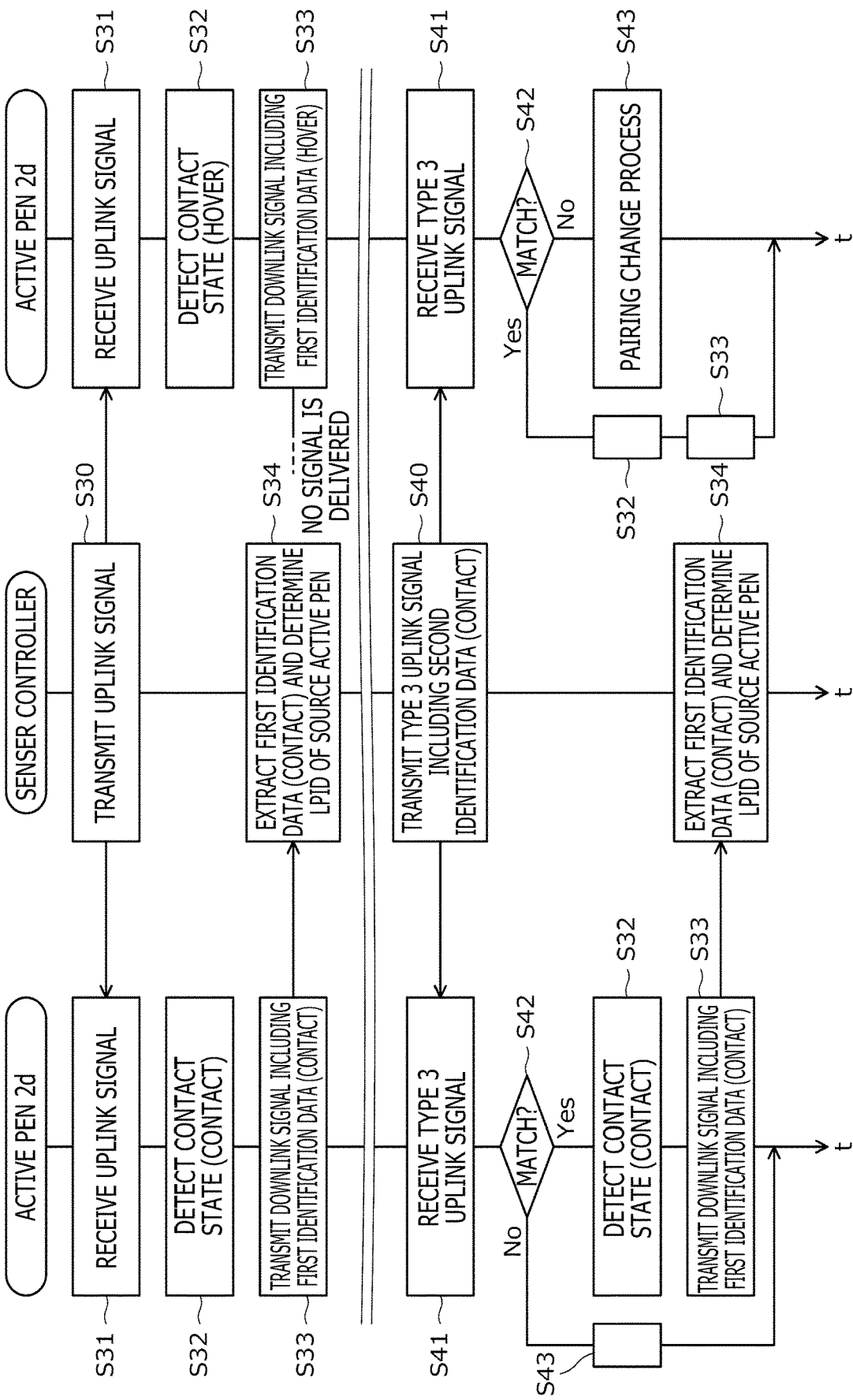

United States Patent No. US 11,429,206 B2

SENSOR CONTROLLER, ACTIVE PEN, AND COMMUNICATION METHOD

BACKGROUND

Technical Field

The present disclosure relates to a sensor controller, an active pen, and a communication method.

BACKGROUND ART

A system is known that performs bidirectional communication and includes an active pen and a sensor controller that are paired. In a system of this type, the sensor controller transmits an uplink signal including a new local pen identifier (ID) and assigned communication configuration data (frequencies, time slots, and the like allowed to be used for transmission of downlink signals), and the active pen receives the uplink signal and returns a response. Pairing identified by the local pen ID is then established. After the pairing is established, the active pen utilizes the assigned communication configuration data to transmit a downlink signal.

U.S. patent application Ser. No. 2016/0246390 (hereinafter, Patent Document 1) discloses an example of the system as described above. According to a technique in Patent Document 1, the sensor controller is configured to hold a quiet ID list. The quiet ID list is a list storing local pen IDs as described above. In a case where reception of a downlink signal from the paired active pen has been interrupted, the sensor controller stores, in the quiet ID list, the local pen ID assigned to the active pen. The local pen IDs stored in the quiet ID list are sequentially assigned to new pairings in the chronological order, oldest first.

However, the technique described in Patent Document 1 disadvantageously delivers degraded performance of the system due to a process for maintaining and managing the pairing state. This will be described below in detail.

While consecutively receiving uplink signals, the active pen can recognize whether the sensor controller still maintains the pairing state with the active pen, based on whether each of the uplink signals includes a command directed to the active pen. However, when the active pen fails to receive uplink signals due to, for example, separation from a touch surface, the active pen may not recognize whether the sensor controller still maintains the pairing state with the active pen. As a result, the next time the active pen transmits a downlink signal, the active pen fails to determine whether the same communication configuration data may be utilized for the transmission.

Thus, in a case of failing to receive an uplink signal at a timing when the active pen otherwise receives the uplink signal, the active pen unilaterally cancels the pairing state, or subsequently when transmitting a downlink signal, performs bidirectional communication with the sensor controller to check the pairing state. However, regardless of which of these processes is performed, inputting fails to be immediately started at the time of next pen down, and the system appears to a user to be delivering degraded performance. In particular, in a case where entrance to and exit from a coverage of uplink signals frequently occur within a short time such as in writing of characters, cancelation or check of the pairing state is performed each time entrance or exit occurs. This causes the performance to appear to be significantly degraded. Furthermore, one uplink signal allows only one active pen to be paired or checked, and thus, in a case where one sensor controller is simultaneously paired with a plurality of active pens (such a case is hereinafter referred to as "multi-pen"), the performance appears to be further degraded.

BRIEF SUMMARY

Thus, an object of the present disclosure is to provide a sensor controller and an active pen capable of suppressing degradation of performance caused by a process for maintaining and managing the pairing state.

Furthermore, in a case where the above-described multi-pen is used, the user typically varies writing attributes (line color, line type, and the like) for each active pen. Within the system, the writing attributes are associated with the local pen IDs for management. However, the local pen IDs are not notified to the user, and the appearances of the active pens are typically exactly the same. Thus, in the related art, the active pen user fails to find which writing attributes have been assigned to which active pens until the user actually writes with the active pens. This is inconvenient and has been desired to be improved.

Accordingly, another object of the present disclosure is to provide an active pen allowing the user to easily recognize the writing attributes assigned to each active pen.

Additionally, in a case where two active pens with a matched global pen ID or a matched hash value of the global pen ID are present near one touch surface, a situation may occur in which the two active pens establish pairing with the sensor controller using the same local pen ID (conflict of pairing). In a case where the sensor controller has a method for detecting a conflict, the conflict state can be avoided by transmitting a command for pairing cancelation from the sensor controller to both active pens. However, this may induce breakage of lines being drawn.

Accordingly, another object of the present disclosure is to provide a communication method, an active pen, and a sensor controller that can avoid a conflict of pairing without inducing breakage of lines being drawn.

A first aspect of the present disclosure provides a sensor controller that is connected to a plurality of sensor electrodes and detects positions of one or more active pens based on charge induced on the sensor electrode, the sensor controller comprising a processor, and a memory storing instructions that, when executed by the processor, cause the sensor controller to: detect an approach of one of the one or more actives pen using the sensor electrodes; pair with the one of the one or more active pens with the approach of the one of the one or more active pens detected, and update pairing state information indicative of a pairing state of each of the one or more active pens that is paired with the sensor controller; and transmit the pairing state information from the sensor electrode to the one or more active pens via an uplink signal used as a reference for time synchronization.

A second aspect of the present disclosure provides an active pen communicating with a sensor controller connected to a sensor electrode, the active pen including a pen tip electrode and an integrated circuit connected to the pen tip electrode. The integrated circuit, in operation, detects, via a coupling capacitance between the pen tip electrode and the sensor electrode, an uplink signal including pairing state information indicative of a pairing state of each of one or more active pens with which the sensor controller is paired, the one or more active pens including the active pen, and maintains or cancels the pairing state of the active pen based on the pairing state information that has been detected, and in a case where the pairing state of the active pen is maintained, transmits a downlink signal configured based on the pairing state of the active pen.

A third aspect of the present disclosure provides an active pen communicating with a sensor controller connected to a sensor electrode, the active pen including a pen tip electrode, an integrated circuit connected to the pen tip electrode, and an indicator. The integrated circuit, in operation, controls the indicator to cause the indicator to provide display for identification of a local pen ID in a case where the local pen ID is indicated to the active pen by an uplink signal transmitted by the sensor controller.

A fourth aspect of the present disclosure provides a communication method performed between an active pen and a sensor controller, the communication method including causing the active pen to transmit a downlink signal including first identification data that distinguishes the active pen from another active pen after the active pen has been paired with the sensor controller, and causing the sensor controller to receive the downlink signal including the first identification data and transmit an uplink signal including second identification data acquired based on the received first identification data that are received.

A fifth aspect of the present disclosure provides an active pen that controls transmission of a downlink signal based on an uplink signal transmitted from a sensor controller, the active pen including a pen tip electrode; and an integrated circuit which, in operation, transmits a downlink signal including first identification data that distinguishes the active pen from another active pen via the pen tip electrode based after the active pen has been paired with the sensor controller, and in a case where an uplink signal including second identification data corresponding to the first identification data is received, controls transmission of a next downlink signal via the pen tip electrode based on the second identification data.

A sixth aspect of the present disclosure provides a sensor controller that detects an active pen, in which the active pen transmits, via a pen tip electrode provided at a pen tip, a downlink signal including first identification data that distinguishes the active pen from another active pen after the active pen has been paired with the sensor controller, the sensor controller is connected to a sensor electrode capacitively coupled to the pen tip electrode, and the sensor controller includes a processor and a memory storing instructions that, when executed by the processor, cause the sensor controller to: receive, via the sensor electrode, the downlink signal including the first identification data, and transmit an uplink signal including second identification data acquired based on the first identification data that are received.

According to the first aspect of the present disclosure, the pairing state information is broadcasted by the uplink signal to all of the one or more active pens that are paired with the sensor controller, the pairing state information being indicative of the pairing state of each of the active pens. Each of the active pens can thus recognize, by seeing the pairing state information, whether pairing with the active pen is maintained in the sensor controller. This eliminates a need for unilateral cancelation of the pairing state and bidirectional communication for a check on the pairing state, enabling suppression of degradation of performance caused by a process for maintaining and managing the pairing state.

According to the third aspect of the present disclosure, each of the active pens provides the display for the identification of the local pen ID. This allows the user to easily recognize the writing attributes assigned to each active pen.

According to the fourth aspect of the present disclosure, even in a case where two active pens with the matched global pen ID or the matched hash value of the global pen ID are present near one touch surface, a conflict of pairing can be avoided without inducing breakage of lines being drawn.

BRIEF DESCRIPTION OF THE DRAWINGS

FIGS. 5A, 5B, and 5C are diagrams illustrating types of the uplink signal transmitted by the sensor controller;

FIG. 8 is a sequence diagram of operations of the sensor controller and the active pen;

FIGS. 9A, 9B, and 9C are diagrams illustrating types of an uplink signal transmitted by a sensor controller according to a second embodiment of the present disclosure; and FIG. 10 is a sequence diagram of operations of the sensor controller and an active pen.

DETAILED DESCRIPTION

Embodiments of the present disclosure will be described below in detail with reference to the attached drawings.

Figure 1:
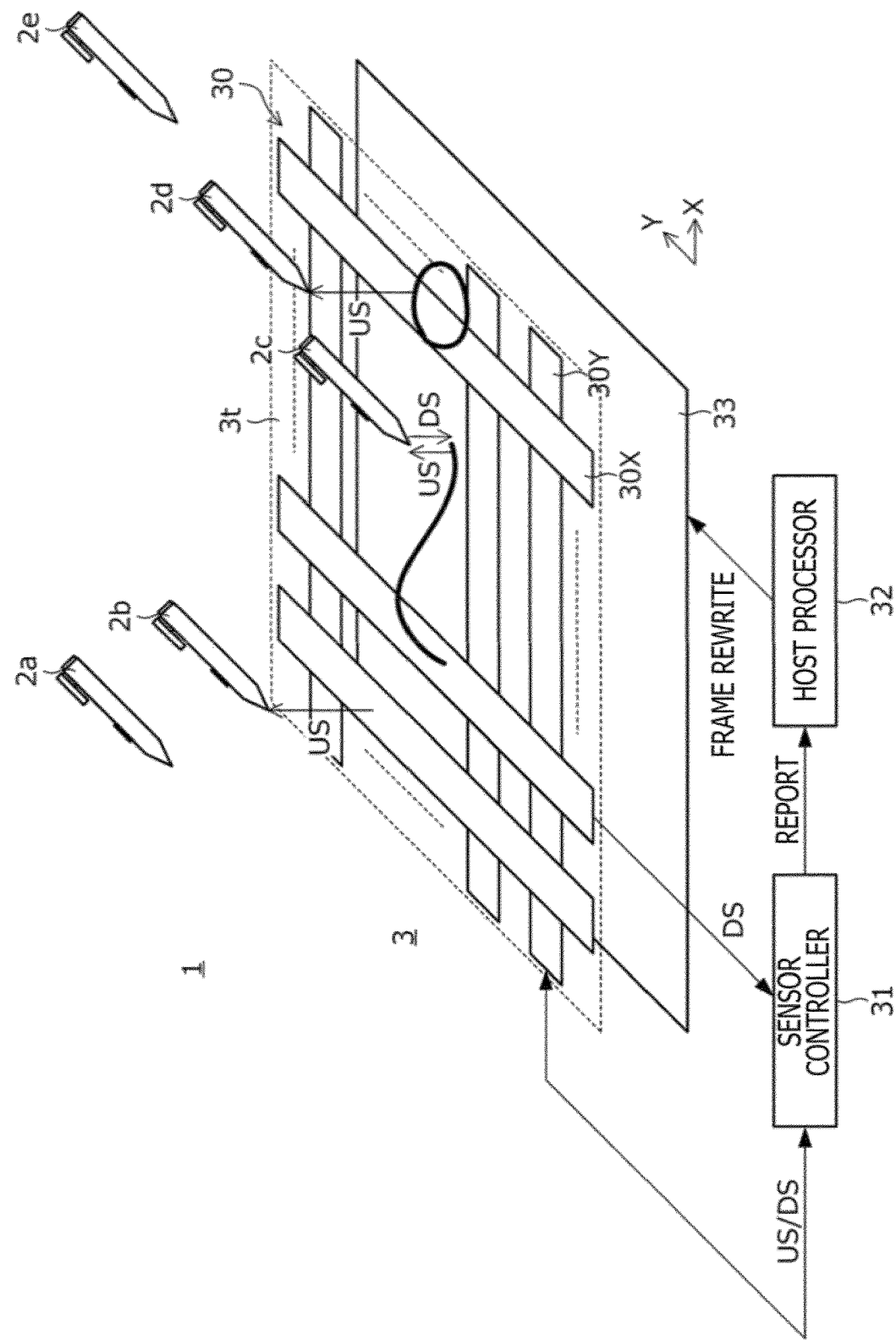
FIG. 1 is a diagram illustrating a general configuration of a position detecting system according to a first embodiment of the present disclosure.

FIG. 1 is a diagram illustrating a general configuration of a position detecting system 1 according to a first embodiment of the present disclosure. As illustrated in FIG. 1, the position detecting system 1 includes a plurality of active pens 2a to 2e and a position detecting device 3 with a touch surface 3t. In the description below, in a case where the active pens 2a to 2e need not be distinguished from one another, the active pens 2a to 2e may be collectively referred to as the active pen 2.

The active pen 2 is, for example, an electronic pen corresponding to an active capacitive method and is configured to be capable of communicating bidirectionally with the position detecting device 3.

Figure 2:
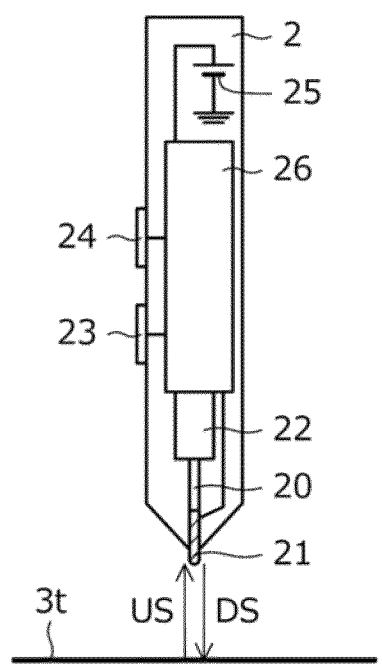
FIG. 2 is a diagram illustrating an internal configuration of an active pen.

FIG. 2 is a diagram illustrating an internal configuration of the active pen 2. As illustrated in FIG. 2, the active pen 2 includes a lead 20, a pen tip electrode 21, a pen pressure detector 22, a switch 23, an indicator 24, a power supply 25, and an integrated circuit 26.

The pen tip electrode 21 is a conductor provided near the lead 20 and is electrically connected to the integrated circuit 26 by wiring. The pen tip electrode 21 is configured to be capacitively coupled to each of a plurality of sensor electrodes 30X and 30Y described below. The pen pressure detector 22 is a functional unit that detects a force (pen pressure) applied to a tip of the lead 20 (pen tip). Specifically, the pen pressure detector 22 is in abutting contact with a tail end of the lead 20. The pen pressure detector 22 is configured to detect, through the abutting contact, the force applied to the lead 20 when a user presses the pen tip of the active pen 2 against the touch surface 3t of the position detecting device 3. In a specific example, the pen pressure detector 22 includes a variable capacitance module having a capacitance varying according to a force applied to the pen tip.

The switch 23 is provided on a side surface of the active pen 2 and can be turned on and off by the user. The indicator 24 is a device providing a display allowing the user to identify a local pen ID applied to the active pen 2 by an uplink signal US described below. The indicator 24 includes, for example, a light emitting diode (LED) number display configured to be capable of displaying numbers or a LED configured to be capable of displaying a plurality of types of colors. The power supply 25 is configured to supply operating power (direct current (DC) voltage) to the integrated circuit 26 and includes, for example, a cylindrical AAAA battery.

The integrated circuit 26 is a processing unit including a group of circuits formed on a substrate (not illustrated) and is connected to each of the pen tip electrode 21, the pen pressure detector 22, the switch 23, and the indicator 24. Processes described below and performed by the active pen 2 are all performed by the integrated circuit 26.

The integrated circuit 26 is configured to be capable of transmitting and receiving signals to and from the position detecting device 3 using the pen tip electrode 21. Among the thus transmitted and received signals, signals transmitted from the position detecting device 3 to the active pen 2 are referred to as uplink signals US, and signals transmitted from the active pen 2 to the position detecting device 3 are referred to as downlink signals DS.

The uplink signal US is typically a signal including a command indicative of contents of control of the active pen 2. In the present embodiment, the uplink signal US serves to broadcast, to all of one or more active pens paired with the sensor controller, pairing state information indicative of a pairing state of each of the active pens. The uplink signal US will be described below in detail with reference to FIGS. 5A, 5B, and 5C. Furthermore, a downlink signal DS is a signal including a burst signal corresponding to an unmodulated carrier signal and a data signal corresponding to a carrier signal modulated by a predetermined data. The integrated circuit 26 acquires data to be transmitted, in accordance with the command included in the uplink signal US, and modulates the carrier signal using the acquired data, to transmit the data signal. Data transmitted by the data signal includes pen pressure detected by the pen pressure detector 22, information indicative of an on/off state of the switch 23, and a global pen ID of the active pen 2. The global pen ID is, unlike the local pen ID, information uniquely assigned to all the active pens 2 and is written into the integrated circuit 26 while the active pens 2 are being manufactured.

Figure 3:
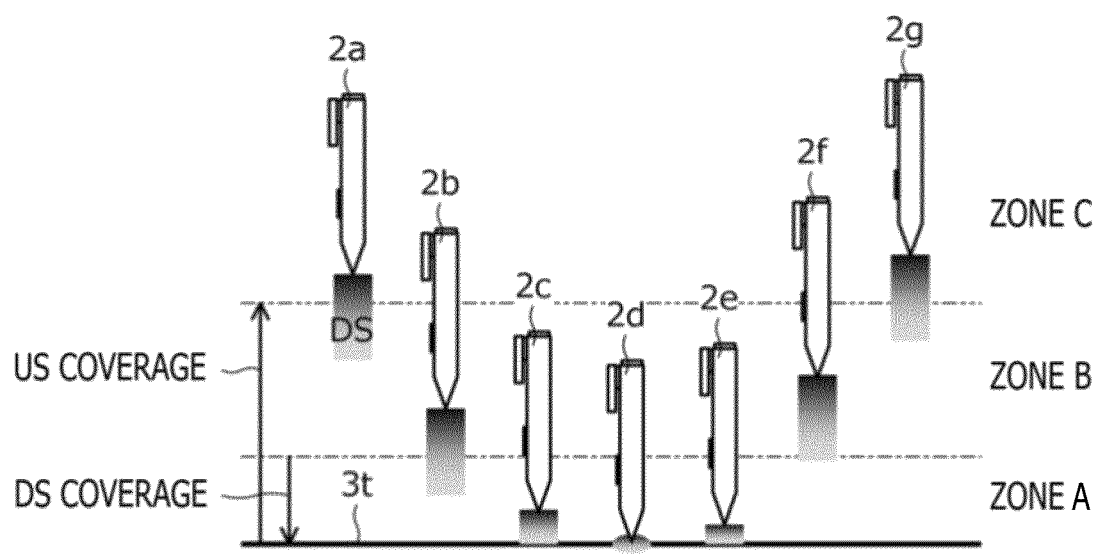
FIG. 3 is a diagram illustrating coverages of an uplink signal and a downlink signal.

FIG. 3 is a diagram illustrating coverages of the uplink signal US and the downlink signal DS. A zone A illustrated in FIG. 3 is specified as follows: when the pen tip electrode 21 of the active pen 2 is located in the zone A, the active pen 2 can receive the uplink signal US transmitted by a sensor controller 31, and the sensor controller 31 can receive the downlink signal DS transmitted by the active pen 2. In an example in FIG. 3, active pens 2c, 2d, and 2e are located in a zone A.

The zone B is specified as follows: when the pen tip electrode 21 of the active pen 2 is located in the zone B, the active pen 2 can receive the uplink signal US transmitted by the sensor controller 31, whereas the sensor controller 31 fails to receive the downlink signal DS transmitted by the active pen 2. The zone B is formed because the coverage of the uplink signal US is larger than the coverage of the downlink signal DS as illustrated in FIG. 3. In the example in FIG. 3, the active pens 2b and 2f are located in the zone B.

The zone C is specified as follows: when the pen tip electrode 21 of the active pen 2 is located in the zone C, the active pen 2 fails to receive the uplink signal US transmitted by the sensor controller 31 and the sensor controller 31 also fails to receive the downlink signal DS transmitted by the active pen 2. In the example in FIG. 3, the active pens 2a and 2g are located in the zone C.

Thus, the area over the touch surface 3t of the position detecting device 3 is classified into the zone A, the zone B, and the zone C in order of increasing distance from the touch surface 3t.

Figure 4:
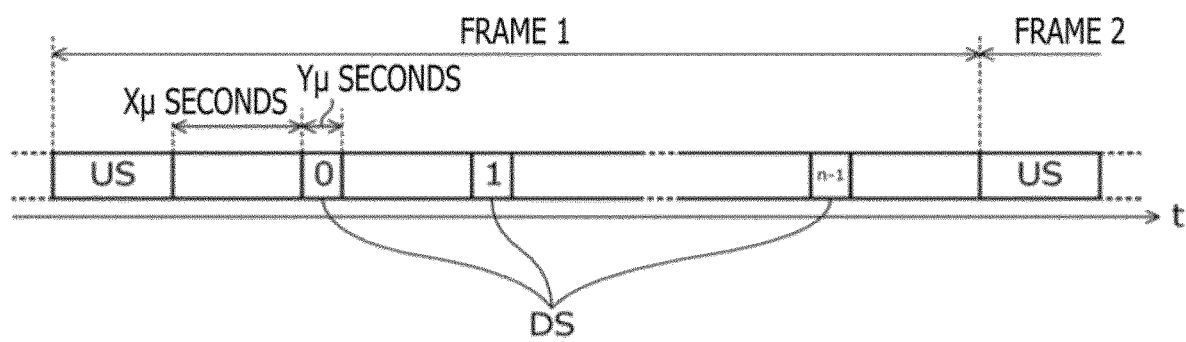
FIG. 4 is a diagram illustrating a structure of a frame used to transmit and receive the uplink signal and the downlink signal.

FIG. 4 is a diagram illustrating a structure of a frame used to transmit and receive the uplink signal US and the downlink signal DS. As illustrated in FIG. 4, the uplink signal US and the downlink signal DS are transmitted and received in units of frames. The frame is, for example, a display period for one screen of a display 33 (described below) included in the position detecting device 3. The uplink signal US is typically transmitted at a head of the frame and serves to notify the active pen 2 of a frame start timing (serves as a reference for time synchronization). The uplink signal US may be transmitted a plurality of times within one frame.

A transmission time for the downlink signal DS within the frame is divided into n time slots. Each time slot has a duration of Yμ seconds, and after the uplink signal US is transmitted, the divisional downlink signals DS are arranged within the frame at intervals of Xμ seconds. During a period of Xμ seconds when transmission of the downlink signal DS is not performed, the following are performed: a display operation by the display 33 described below, a finger position detecting operation by the sensor controller 31 described below, and the like. Within each time slot, the downlink signal DS with a predetermined number of symbols is simultaneously transmitted by a plurality of active pens 2.

The position detecting device 3 is configured to assign different combinations of frequencies and time slots to the respective active pens 2 paired with the sensor controller 31. Each of the active pens 2 uses the assigned combination of frequencies and time slots to transmit the downlink signal DS. This enables a plurality of active pens 2 to transmit the downlink signal DS within the same frame.

Referring back to FIG. 1, the position detecting device 3 is a device configured to be capable of detecting the position of each active pen 2 within the touch surface 3t. The position detecting device 3 is typically a computer such as a tablet terminal, and a display surface of the display corresponds to the touch surface 3t. However, the position detecting device 3 may be a digitizer with no display surface. In the description below, the position detecting device 3 is assumed to be a tablet terminal.

The position detecting device 3 includes a sensor 30 disposed immediately below the touch surface 3t, the sensor controller 31, a host processor 32 controlling the functions of units of the position detecting device 3 including the touch surface 3t and the controller 31, and the display 33 disposed below the sensor 30.

The sensor 30 constitutes a mutual-capacitance touch sensor and includes a plurality of sensor electrodes 30X and a plurality of sensor electrodes 30Y arranged in a matrix. The plurality of sensor electrodes 30X include a plurality of linear conductors extending in an illustrated Y direction and arranged at regular intervals in an X direction orthogonal to the Y direction. Furthermore, the plurality of sensor electrodes 30Y include a plurality of linear conductors extending in the X direction and arranged at regular intervals in the Y direction. FIG. 1 illustrate only some of the plurality of sensor electrodes 30X and 30Y. The plurality of the sensor electrodes 30Y may also serve as common electrodes of the display 33, and in this case, the position detecting device 3 is referred to as an "in-cell type." In contrast, the position detecting device 3 with the common electrodes in the display provided separately from the sensor electrodes 30X and 30Y is referred to as, for example, an "out-cell type" or an "on-cell type." In the description below, the position detecting device 3 is of the in-cell type.

The sensor controller 31 is a device connected to each of the plurality of sensor electrodes 30X and 30Y to detect positions of one or more active pens 2 depending on charge induced on the sensor electrodes 30X and 30Y. In one or more embodiments, the sensor controller 31 includes a processor and a memory storing instructions that, when executed by the processor, cause the sensor controller 31 to perform the functions described herein. Specifically, the sensor controller 31 includes a function to detect an indicated position of each active pen 2 on the touch surface 3t and receive data transmitted by each active pen 2 using the downlink signal DS, and a function to detect a position of the finger on the touch surface 3t. In a case where the position detecting device 3 is of the in-cell type, the sensor controller 31 also includes a function to apply, to the plurality of sensor electrodes 30Y, a common potential needed for the display operation of the display 33 (driving operation for pixel electrodes).

The sensor controller 31 includes, for the active pen 2, a function to transmit the uplink signal US toward each active pen 2 and receive the downlink signal DS transmitted by each active pen 2, through the sensor 30. In a case where the burst signal in the downlink signal DS is received, the sensor controller 31 derives the indicated position of the active pen 2 based on a reception level of the burst signal at each of the sensor electrodes 30X and 30Y, and reports the indicated position to the host processor 32. Furthermore, in a case where the data signal in the downlink signal DS is received, the sensor controller 31 demodulates the data signal to retrieve data transmitted by the active pen 2 and reports the data to the host processor 32.

The host processor 32 is a central processing unit controlling the entirety of the position detecting device 3. Various applications such as a drawing application and a communication application are operatively configured on the host processor 32. The drawing application serves to generate and store ink data indicative of a trace of the active pen 2 or the finger on the touch surface 3t based on a sequence of positions of the active pen 2 or the finger sequentially reported by the sensor controller 31 and to render the stored ink data. The drawing application also controls the line width, transparency, line color, and the like of the ink data to be rendered, in accordance with the reported data, in a case where a report of the data transmitted from the active pen 2 is received from the sensor controller 31. The host processor 32 further controllably rewrites display contents of the display 33 on a frame-by-frame basis. The display contents of the display 33 include an image resulting from the rendering.

FIGS. 5A, 5B, and 5C are diagrams illustrating types of the uplink signal US transmitted by the sensor controller 31. As illustrated in FIGS. 5A, 5B, and 5C, the uplink signal US includes three types, type 1 to type 3. The sensor controller 31 appropriately uses these types to control the active pens 2.

The type 1 uplink signal US illustrated in FIG. 5A is a signal broadcasted to all the active pens 2 in order to detect approach of each of the active pens 2. The type 1 uplink signal US includes an uplink signal type flag 1, frame structure information, communication configuration data, and pairing state information.

The uplink signal type flag 1 is a flag allowing the active pen 2 to distinguish the type 1 uplink signal US from the type 2 and 3 uplink signals US. In the type 1 uplink signal US, the uplink signal type flag 1 is set to "0." Accordingly, the uplink signal type flag 1 of "0" constitutes address information indicating that the signal is to be transmitted to all the active pens 2.

The frame structure information is information indicative of the structure of the frame identified by a duration of the frame, a position of the uplink signal US within the frame, specific durations of Xμ seconds and Yμ seconds illustrated in FIG. 4, a number of time slots included in the frame, a set of available frequencies, and the like. Specific frame structure information includes identification information indicative of one of a plurality of structures preliminarily shared between the active pen 2 and the sensor controller 31.

The communication configuration data is data indicative of a combination of frequencies and time slots assigned to the active pen 2 with which the sensor controller 31 is to communicate. Specific communication configuration data includes identification information indicative of one of a plurality of combinations preliminarily shared between the active pen 2 and the sensor controller 31.

The pairing state information is information indicative of the pairing state of each of one or more active pens 2 with which the sensor controller 31 is paired. The pairing state information includes a pairing flag indicating whether the sensor controller 31 is paired with the active pen 2, for each local pen ID (LPID) assigned to each active pen 2 at the time of pairing. The pairing flag is information indicative of "1" in a case where the corresponding local pen ID is assigned to any of the active pens 2 and of "0" in a case where the corresponding local pen ID is assigned to none of the active pens 2. FIGS. 5A, 5B, and 5C illustrate examples of the sensor controller 31 capable of being simultaneously paired with up to six active pens 2. In this case, six local pen IDs of 1 to 6 are provided, and the pairing state information includes six pairing flags.

Here, the pairing state is one of a state where the pairing is completed and maintained or a state where pairing is not maintained. In the state where the pairing is completed and maintained, configurations are maintained that are needed to enable the active pen 2 to supply signals to the position detecting device 3. Needed configurations include a configuration regarding a communication channel (for example, frequencies or time slots) and a delivery state of communication resources or parameters such as a grant state of a local pen ID. On the other hand, in the state where the pairing is not maintained, the configurations are not provided that are needed to enable the active pen 2 to supply signals to the position detecting device 3.

The pairing state information in the type 1 uplink signal US further includes a pairing enable/disable flag. The pairing enable/disable flag is indicative of "1" when the sensor controller 31 is enabled to establish a new pairing and of "0" when the sensor controller 31 is disabled to establish a new pairing. The sensor controller 31 sets the pairing enable/disable flag to "0" in a case where the sensor controller 31 is paired with a maximum allowable number (six in the example in FIGS. 5A, 5B, and 5C) of active pens 2 and otherwise to "1."

Among the active pens 2 having received the type 1 uplink signal US, the active pens 2 not paired with the sensor controller 31 yet first reference the pairing enable/disable flag. In a case where the pairing enable/disable flag is set to "1," these active pens 2 temporarily store, in a memory (not illustrated), the frame structure information, communication configuration data, and pairing state information included in the received uplink signal US. The active pens 2 also use the frequencies and time slots indicated by the stored communication configuration data to transmit the downlink signal DS including a pairing request. The pairing request includes the above-described global pen ID.

On the other hand, among the active pens 2 having received the type 1 uplink signal US, the active pens 2 paired with the sensor controller 31 each reference the pairing flag corresponding to the local pen ID assigned to the active pen 2. In a case where the pairing flag is set to "1," these active pens 2 continuously maintain the pairing state. On the other hand, in a case where the pairing flag is set to "0," the active pens 2 determine that the sensor controller 31 has canceled the pairing state, and cancel the pairing state.

The type 2 uplink signal US illustrated in FIG. 5B is a signal transmitted as a response to the downlink signal DS including a pairing request in order to pair with the active pen 2 with approach of the active pen 2 detected. The type 2 uplink signal US includes an uplink signal type flag 1, an uplink signal type flag 2, pairing target active pen information, and pairing state information. In the type 2 uplink signal US, the uplink signal type flag 1 is set to "1."

The uplink signal type flag 2 is a flag allowing the active pen 2 to distinguish the type 2 uplink signal US from the type 3 uplink signal US. In the type 2 uplink signal US, the uplink signal US type flag 2 is set to "0."

The pairing target active pen information includes the global pen ID included in the pairing request or a hash value of the global pen ID. Accordingly, the pairing target active pen information constitutes address information indicative of the active pen 2 to which the uplink signal US is to be transmitted. The hash value constituting the pairing target active pen information is calculated by the sensor controller 31 using a predetermined hash function preliminarily shared between the sensor controller 31 and each active pen 2.

The pairing state information in the type 2 uplink signal US is similar to the pairing state information in the type 1 uplink signal US except the type 2 uplink signal US does not include a pairing enable/disable flag. However, in response to reception of the downlink signal DS including the pairing request, the sensor controller 31 determines the local pen ID to be assigned to the active pen 2 having transmitted the downlink signal DS and updates, to "1," the pairing flag corresponding to the determined local pen ID. This is a process for notifying the active pen 2 of the local pen ID to be newly assigned.

In a case of receiving the type 2 uplink signal US, the active pen 2 first determines whether the global pen ID or the hash value of the global pen ID included in the pairing target active pen information belongs to the active pen 2. In a case where it is determined that the global pen ID or the hash value belongs to the active pen 2, the active pen 2 compares the pairing state information in the last received and stored type 1 uplink signal US with the pairing state information in the currently received type 2 uplink signal US. As a result of the comparison, the active pen 2 acquires and stores the local pen ID with the corresponding pairing flag changed from "0" to "1," in a memory (not illustrated) as the local pen ID assigned to this active pen 2. The active pen 2 also stores the temporarily stored frame structure information and communication configuration data in the memory (not illustrated). Thus, inside the active pen 2, the pairing state between the active pen 2 and the sensor controller 31 is established.

The active pen 2, having established the pairing state, uses the frequencies and time slots indicated by the stored communication configuration data to transmit the downlink signal DS. The downlink signal DS may include, for example, pen pressure. The sensor controller 31 receives the thus transmitted downlink signal DS, and adds, to a list in the memory (not illustrated), information indicative of the active pen 2 having transmitted the downlink signal DS, to establish the state of pairing with the active pen 2.

The type 3 uplink signal US illustrated in FIG. 5C is a signal transmitted to control one of the one or more active pens 2 paired with the sensor controller 31. The type 3 uplink signal US includes an uplink signal type flag 1, an uplink signal type flag 2, a command, and pairing state information. In the type 3 uplink signal US, the uplink signal type flag 1 and the uplink signal type flag 2 are each set to "1."

The command is information including the content of control of the active pen 2 and the local pen ID indicative of the active pen 2 to be controlled. The specific content of the control indicated by the command includes transmission of the pen pressure detected by the pen pressure detector 22 or transmission of information indicative of an on/off state of the switch 23.

In a case of receiving the type 3 uplink signal US, the active pen 2 first determines whether the local pen ID assigned to the active pen 2 is included in the command. In a case of determining the local pen ID to be included in the command, the active pen 2 performs a process corresponding to the content of the control indicated by the command. For example, in a case where the content of the control indicated by the command is transmission of the pen pressure detected by the pen pressure detector 22, the active pen 2 acquires the latest pen pressure from the pen pressure detector 22 and includes the pen pressure in the downlink signal DS for transmission.

Figure 6:
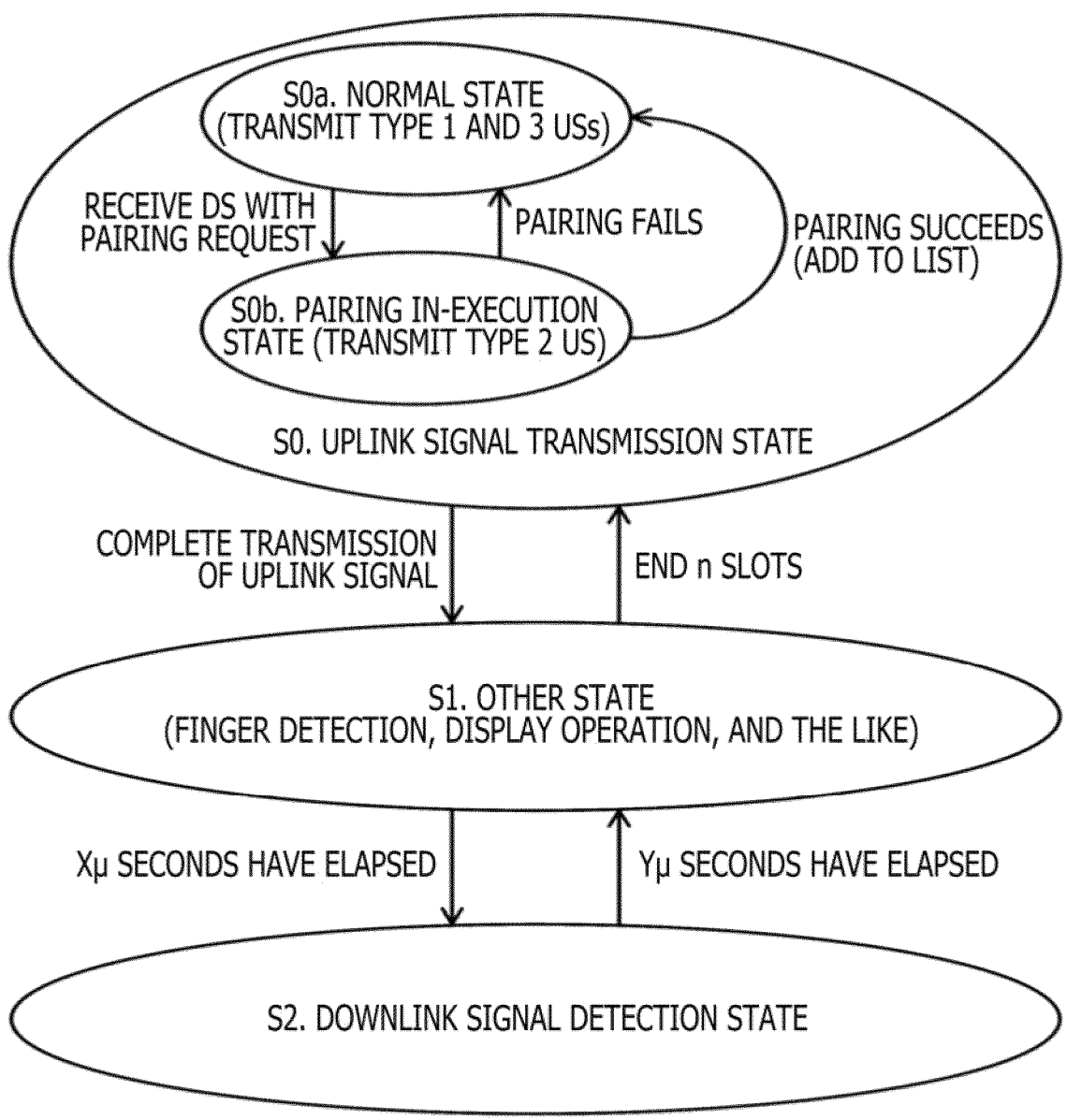
FIG. 6 is a state transition diagram of the sensor controller.
Figure 7:
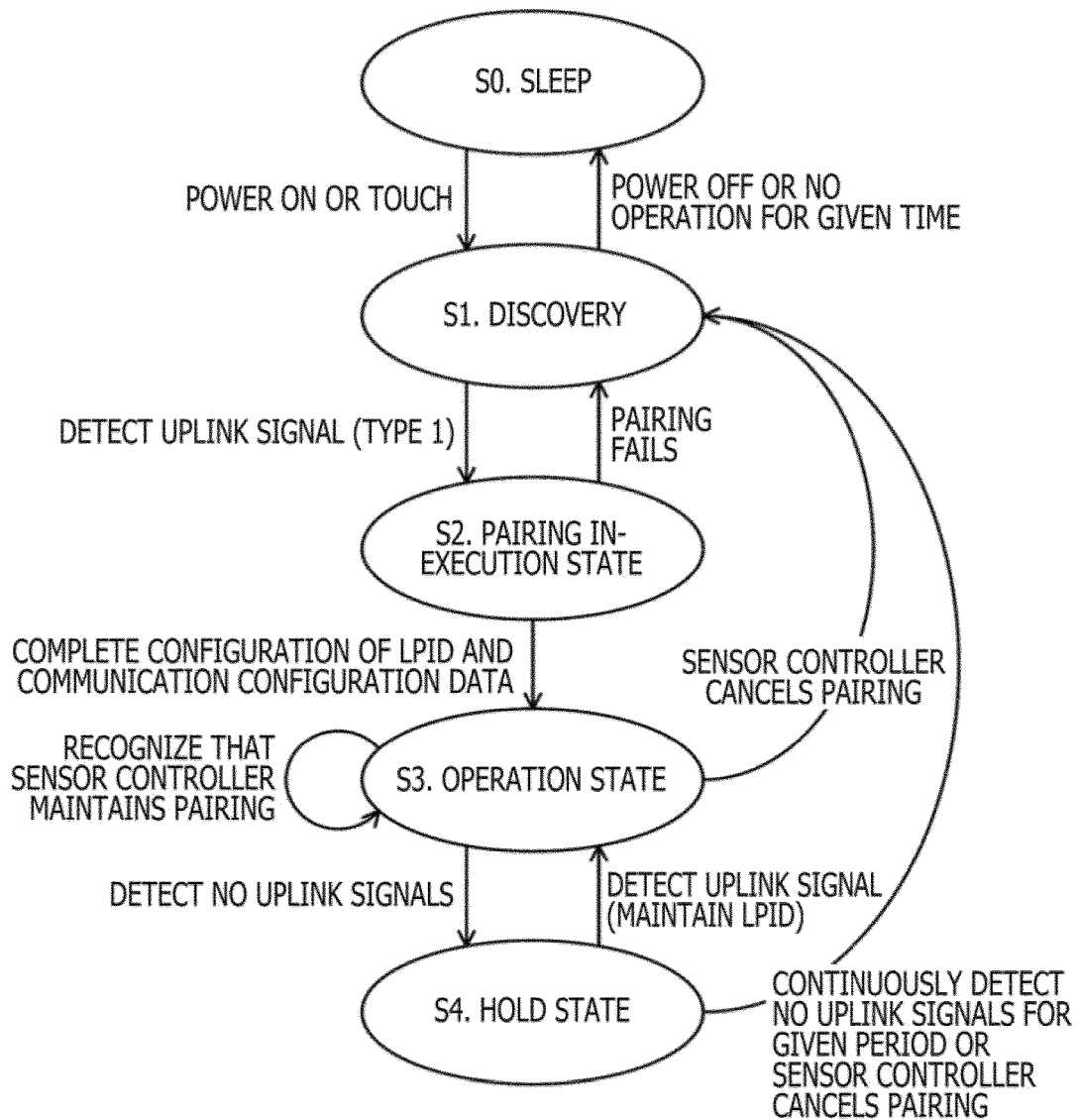
FIG. 7 is a state transition diagram of the active pen.

FIG. 6 and FIG. 7 are each a state transition diagram of the sensor controller 31 and the active pen 2. With reference back to FIG. 4 and FIGS. 5A, 5B, and 5C, described above, in addition to FIG. 6 and FIG. 7, operations of the sensor controller 31 and the active pen 2 will be described in further detail.

First, as seen in FIG. 6, the sensor controller 31 is configured to operate in one of an uplink signal transmission state S0, other state S1, and a downlink signal detection state S2. The uplink signal transmission state S0 includes a normal state S0a and a pairing in-execution state S0b.

The sensor controller 31 is initially in the normal state S0a. In this state, the sensor controller 31 transmits one of the type 1 uplink signal US illustrated in FIG. 5A or the type 3 uplink signal US illustrated in FIG. 5C. In this case, the sensor controller 31 suitably transmits type 1 uplink signals US while limiting the interval between the uplink signals US to smaller than a certain value. This enables the sensor controller 31 to be paired, at an appropriate timing, with the active pen 2 newly approaching the sensor controller 31.

In a case of receiving the downlink signal DS including the pairing request in response to the transmitted type 1 uplink signal US, the sensor controller 31 transits to the pairing in-execution state S0b. In the pairing in-execution state S0b, the sensor controller 31 transmits the type 2 uplink signal US. As a result, in a case of receiving the downlink signal DS transmitted using the frequencies and time slots indicated by the communication configuration data transmitted in the last type 1 uplink signal US, the sensor controller 31 determines that the pairing has succeeded. The sensor controller 31 adds, to the list (not illustrated), information about the active pen 2 having transmitted the downlink signal DS, to establish the pairing and returns to the normal state S0a. On the other hand, in a case of failing to receive such a downlink signal DS, the sensor controller 31 determines that the pairing has failed and returns to the normal state S0a.

Once the sensor controller 31 completes transmission of the uplink signal US, the sensor controller 31 temporarily transits to the other state S1 regardless of the type of the uplink signal US. In the other state S1, the sensor controller 31 performs an operation of detecting the position of the finger or an operation for display on the display 33 (specifically, application of the above-described common potential). While the sensor controller 31 is in the other state S1, the host processor 32 illustrated in FIG. 1 may execute a part of rewrite control of the display contents (for example, control for one gate line). In a case where Xµ seconds have elapsed since the transition to the other state S1, the sensor controller 31 transits to the downlink signal detection state S2.

After transiting to the downlink signal detection state S2, the sensor controller 31 performs an operation of detecting, via the sensor 30 illustrated in FIG. 1, the downlink signal DS transmitted by the active pen 2. In a case where Yµ seconds have elapsed since the transition to the downlink signal detection state S2, the sensor controller 31 returns to the other state S1 to perform again the operation of detecting the position of the finger or the operation for the display on the display 33.

The sensor controller 31 repeats each of the other state S1 and the downlink signal detection state S2 n times. The sensor controller 31 then returns to the uplink signal transmission state S0 to transmit the uplink signal US.

As seen in FIG. 7, the active pen 2 is configured to operate in one of a sleep state S0, a discovery state S1, a pairing in-execution state S2, an operation state S3, and a hold state S4.

The active pen 2 is initially in the sleep state S0. In this state, in a case of being powered on, the active pen 2 transits to the discovery state S1. Furthermore, the active pen 2 in the sleep state S0 continuously performs an operation of detecting occurrence of a touch operation. In a case of detecting occurrence of a touch operation, the active pen 2 also transits to the discovery state S1. The occurrence of the touch operation may be detected, for example, based on the pen pressure detected by the pen pressure detector 22 exceeding a predetermined value or based on induction of charge on the pen tip electrode 21.

In a case of being powered off, the active pen 2 in the discovery state S1, returns to the sleep state S0. Furthermore, the active pen 2 in the discovery state S1 continuously performs the operation of detecting occurrence of a touch operation. In a case of detecting no occurrence of a touch operation for a given time, the active pen 2 returns to the sleep state S0. Also in this case, occurrence of a touch operation may be detected, for example, based on the pen pressure detected by the pen pressure detector 22 exceeding the predetermined value or based on induction of charge on the pen tip electrode 21.

The active pen 2 in the discovery state S1 further performs an operation of detecting the uplink signal US via coupling capacitance between the pen tip electrode 21 and each of the plurality of sensor electrodes 30X and 30Y. In a case where the type 1 uplink signal US is detected as a result of the detecting operation, the active pen 2 transits to the pairing in-execution state S2. At this time, the active pen 2 temporarily stores the frame structure information, communication configuration data, and pairing state information included in the detected uplink signal US as described above.

In the pairing in-execution state S2, the active pen 2 uses the frequencies and time slots indicated by the stored communication configuration data to transmit the downlink signal DS including the pairing request. The active pen 2 then performs the operation of detecting the uplink signal US, and in a case of detecting the type 2 uplink signal US including the global pen ID of the active pen 2 or the hash value of the global pen ID, the active pen 2 acquires the local pen ID assigned to the active pen 2, from the pairing state information included in the type 2 uplink signal US. The active pen 2 then configures the local pen ID in the memory (not illustrated) in the integrated circuit 26 along with the stored communication configuration data, to establish the pairing state. The active pen 2 also controls the indicator 24 to cause the indicator 24 to provide display for identification of the acquired local pen ID. The active pen 2 subsequently transits to the operation state S3. On the other hand, in a case of failing to detect, within a predetermined time, the type 2 uplink signal US including the global pen ID of the active pen 2 or the hash value of the global pen ID, the active pen 2 determines that the pairing has failed to return to the discovery state S1.

Each time the active pen 2, having transited to the operation state S3, receives the uplink signal US, the active pen 2 references the pairing state information in the uplink signal US. The active pen 2 thus recognizes that the pairing flag corresponding to the local pen ID of the active pen 2 is set to "1," that is, that the sensor controller 31 maintains the pairing with the active pen 2. Then, as long as the active pen 2 can recognize that the sensor controller 31 maintains the pairing with the active pen 2, the active pen 2 maintains the operation state S3 and transmits the downlink signal DS using the configuration based on the pairing state (that is, using the frequencies and time slots indicated by the stored communication configuration data). On the other hand, in a case of recognizing that the pairing flag corresponding to the local pen ID of the active pen 2 is set to "0" and that the sensor controller 31 does not maintain the pairing with the active pen 2, the active pen 2 returns to the discovery state S1.

In the operation state S3, in a case where the uplink signal US is no longer detected (for example, in a case where the active pen 2 has moved to the zone C in FIG. 3), the active pen 2 temporarily transits to the hold state S4 instead of immediately returning to the discovery state S1. The hold state S4 is intended to maintain the pairing state for a predetermined time even after detection of the uplink signal US fails. The active pen 2 in the hold state S4 cancels the pairing state to return to the discovery state S1 in a case where detection of no uplink signals US continues for a given period or in a case where, in spite of successful detection of the uplink signal US, the pairing state information included in the uplink signal US allows the active pen 2 to recognize that the sensor controller 31 has canceled the state of pairing with the active pen 2. At this time, the active pen 2 suspends holding of the local pen ID and the communication configuration data and controls the indicator 24 to cause the indicator 24 to stop the display for identification of the local pen ID. On the other hand, in a case where, during the hold state S4, the pairing state information included in the uplink signal US allows the active pen 2 to recognize that the sensor controller 31 maintains the pairing with the active pen 2, the active pen 2 returns to the operation state S3.

FIG. 8 is a sequence diagram illustrating operations of the sensor controller 31 and the active pen 2. With reference to FIG. 8, operations of the sensor controller 31 and the active pen 2 related to the pairing will be described again below from a different viewpoint.

The sensor controller 31 transmits, in each frame, the type 1 uplink signal US illustrated in FIG. 5A (S10 and S11). As illustrated in FIG. 8, when the active pen 2 is assumed to receive the type 1 uplink signal US in the frame 1 (S12), the active pen 2 transmits the downlink signal DS including the pairing request (S13). The pairing request includes the global pen ID as described above.

The sensor controller 31 receives the downlink signal DS including the pairing request (S14) and then transmits, in the next frame 2, the type 2 uplink signal US illustrated in FIG. 5B (S15). As described above, the type 2 uplink signal US includes the pairing target active pen information indicative of the global pen ID or the hash value of the global pen ID included in the pairing request, and the pairing state information with the pairing flag for the newly assigned local pen ID having changed from "0" to "1."

The active pen 2 receives the type 2 uplink signal US, and then acquires the local pen ID assigned to the active pen 2, from the pairing state information in the type 2 uplink signal US, and stores the local pen ID. The active pen 2 also stores the communication configuration data included in the last received type 1 uplink signal US (S16). The active pen 2 subsequently uses the frequencies and time slots indicated by the stored communication configuration data to transmit the downlink signal DS (S17). As described above, the downlink signal DS includes the burst signal and the data signal indicative of, for example, the pen pressure detected by the pen pressure detector 22 illustrated in FIG. 2. The sensor controller 31 receives the downlink signal DS and detects the position of the active pen 2 based on the burst signal. The sensor controller 31 also acquires the pen pressure or the like from the data signal, and outputs ink data as described above based on the result of the acquisition (S18).

As described above, according to the present embodiment, the pairing state information is broadcasted by the uplink signal US to all of the one or more active pens 2 paired with the sensor controller 31, the pairing state information indicative of the pairing state of each of the active pens 2. Each of the active pens can thus recognize, by seeing the pairing state information, whether pairing with the active pen is maintained in the sensor controller 31. This eliminates a need for unilateral cancelation of the pairing state and bidirectional communication for a check on the pairing state, enabling suppression of degradation of performance caused by a process for maintaining and managing the pairing state.

Furthermore, according to the present embodiment, each of the active pens 2 causes the indicator 24 illustrated in FIG. 2 to provide a display for identification of the local pen ID. Thus, the user can easily recognize the writing attributes assigned to each active pen 2.

Now, the position detecting system 1 according to a second embodiment of the present disclosure will be described. The position detecting system 1 according to the present embodiment differs from the position detecting system 1 according to the first embodiment in that the active pen 2 and the sensor controller 31 paired with each other transmit and receive data (first and second identification data described below) to and from each other, the data being required to distinguish a plurality of active pens 2 from each other. The position detecting system 1 according to the present embodiment is otherwise similar to the position detecting system 1 according to the first embodiment, and thus, components of the present embodiment identical to the corresponding components of the first embodiment are denoted by identical reference signs, and in the description below, differences from the first embodiment are focused on.

The present embodiment relates to avoiding a conflict of pairing that may occur in the position detecting system 1 according to the first embodiment in a case where two active pens 2 with the matched global pen ID or the matched hash value of the global pen ID are present near one touch surface 3t. The object and general configuration of the present disclosure will first be described, and the present embodiment will then be described in detail.

First, it is assumed that two active pens 2 with the matched global pen ID or the matched hash value of the global pen ID approach the touch surface 3t while both active pens 2 are in an unpaired state and that one of the active pens 2 is located in a zone A illustrated in FIG. 3, whereas the other active pen 2 is located in a zone B illustrated in FIG. 3. In this state, when the sensor controller 31 transmits the type 1 uplink signal US (S11 in FIG. 8), the uplink signal US is received by both two active pens 2. Then, each of the two active pens 2 transmits the downlink signal DS including the pairing request (S13 in FIG. 8). However, the downlink signal DS transmitted by the active pen 2 located in the zone B does not reach the sensor controller 31, and thus, the sensor controller 31 receives only one downlink signal DS. As a result, the sensor controller 31 transmits, as usual, the type 2 uplink signal US including the global pen ID or the hash value of the global pen ID included in the downlink signal DS successfully received (S15 in FIG. 8). The uplink signal US is received by both two active pens 2. Then, both two active pens 2 having transmitted the downlink signal DS determine that the global pen ID or the hash value of the global pen ID included in the received uplink signal US belongs to the active pens. As a result, the two active pens 2 establish pairing with the sensor controller 31 via the same local pen ID. In other words, a conflict of pairing occurs.

In a case where such a conflict of pairing occurs, the conflict state can be avoided by transmitting a command for pairing cancelation from the sensor controller 31 to both active pens 2 in a case where the sensor controller 31 has a method for detecting a conflict. However, such pairing cancelation induces breakage of lines being drawn. Note that the identical local pen ID precludes an operation in which only one of the active pens 2 is instructed to cancel pairing with the sensor controller 31 by using the command transmitted by the sensor controller 31. Additionally, in a case where the sensor controller 31 has no method for detecting a collision, cancelling pairing as described above is prevented, and the state of conflict of pairing continues until one of the active pens 2 moves away into a zone C illustrated in FIG. 3.

In addition, the continuing state of a conflict of pairing makes the downlink signal DS transmitted by one of the active pen 2 noise to the downlink signal DS transmitted by the other active pen 2, reducing detection accuracy for the position of the active pen 2. Furthermore, the downlink signal DS not received by the sensor controller 31 has been uselessly transmitted, thus also wastefully consuming power for the active pens 2.

Thus, in the present embodiment, data required to distinguish the active pens 2 from each other (first identification data) is assumed to be arranged in the downlink signal DS. In a typical example, the first identification data is data indicating whether the pen tip is in contact with the touch surface 3t (contact state data). In the description below, the first identification data is assumed to be contact state data.

The sensor controller 31 receives, from the active pen 2, the downlink signal DS including the first identification data, and then arranges the second identification data acquired based on the received first identification data, in the uplink signal US to be transmitted to the active pen 2. The second identification data is, for example, data having the same contents as those of the first identification data.

The active pen 2 compares the thus received second identification data with the first identification data transmitted by the active pen 2 to determine whether the active pen 2 has been correctly detected by the sensor controller 31. Then, in a case where the active pen 2 is determined not to have been correctly detected, the active pen 2 cancels the pairing. Thus, for example, the pairing of the active pen 2 with the pen tip in contact with the touch surface 3t is maintained, whereas the pairing of the active pen 2 being hovered (with the pen tip not in contact with the touch surface 3t) is canceled, enabling a conflict of pairing to be avoided without inducing breakage of lines being drawn. As a result, the detection accuracy for the position of the active pen 2 can be prevented from being reduced, and wasteful consumption of power for the active pen 2 can be prevented.

The object and general configuration of the disclosure according to the present embodiment have been described. Now, the configuration and operation of the position detecting system 1 according to the present embodiment will be described in detail. In the description below as well, the first identification data is assumed to be contact state data.

FIGS. 9A, 9B, and 9C diagrams illustrating types of the uplink signal US transmitted by the sensor controller 31 according to the present embodiment. As illustrated in FIGS. 9A, 9B, and 9C, in the present embodiment, the uplink signal US is also classified into three types, type 1 to type 3. Of the uplink signals US, the type 1 and the type 2 uplink signals US are identical to the respective uplink signals according to the first embodiment illustrated in FIGS. 5A and 5B. On the other hand, the type 3 uplink signal US is different from the uplink signal according to the first embodiment illustrated in FIG. 5C in terms of the configuration of the pairing state information.

Specifically, pairing state information included in the type 3 uplink signal US according to the present embodiment includes a data type flag and pairing data for each local pen ID. The data type flag is 1-bit data indicative of the type of specific content of each pairing data. The data type flag is "0" when the pairing data is the pairing flag described above, and the data type flag is "1" when the pairing data is the second identification data described above. Thus, the type 2 and type 3 uplink signals US with the data type flag of "1" are each a signal including the second identification data for each local pen ID (LPID). Note that the sensor controller 31 is configured to alternately transmit the type 3 uplink signal US with the data type flag of "0" and the type 3 uplink signal US with the data type flag of "1" at transmission timings for the type 3 uplink signal US in a predetermined ratio (for example, 1:1).

Needless to say, the transmission ratio of the type 3 uplink signal US with the data type flag of "0" to the type 3 uplink signal US with the data type flag of "1" can be changed as appropriate. Depending on the priorities of the uplink signals US, the transmission ratio may be set to, for example, "10:1." Alternatively, in a case where the second identification data is contact state data, for example, the transmission timings for the type 3 uplink signal US with the data type flag of "1" may be limited to timings when the state of the active pen changes, such as when the active pen comes into contact with the touch surface 3t for the first time after pairing with the sensor controller 31 or when the active pen 2 subsequently comes into a hover state. This increases the transmission frequency of the pairing flag with a high priority, enabling management of the pairing state to be optimized.

FIG. 10 is a sequence diagram of operations of the sensor controller 31 and the active pen 2 according to the present embodiment. With reference to FIG. 10, the operations of the sensor controller 31 and the active pen 2 related to the first and second identification data will be described in detail. Note that, although not illustrated in FIG. 10, the acts described with reference to FIG. 8 and the like are actually performed. Additionally, FIG. 10 illustrates the active pens 2b and 2d illustrated in FIG. 3 (the active pen 2 located in the zone B and the active pen 2 with the pen tip in contact with the touch surface 3t). Furthermore, FIG. 10 illustrates that a conflict of pairing described above is occurring between the active pens 2b and 2d (that is, the active pens 2b and 2d store the same local pen ID).

First, when the sensor controller 31 transmits the uplink signal US (S30), each of the active pens 2b and 2d receives the uplink signal US (S31). Note that the uplink signal US may be of any one of the types 1 to 3.

Here, the type 2 uplink signal US is a signal with the destination of the signal identified by the global pen ID or the hash value of the global pen ID, and the type 3 uplink signal US is a signal with the destination of the signal identified by the local pen ID. However, for the active pens 2b and 2d, these pieces of data all have an identical value. Accordingly, even in a case where the uplink signal US transmitted at S30 is the type 2 or type 3 uplink signal US, the uplink signal US is received by both the active pens 2b and 2d at S31.

The active pens 2b and 2d, having received the uplink signal US at S31, reference the pen pressure detected by the pen pressure detector 22 (see FIG. 2) to detect the contact state indicating contact of each pen tip with the touch surface 3t (S32). The contact state thus detected is "hover" for the active pen 2b and "contact" for the active pen 2d. Then, the downlink signal DS including the first identification data indicative of the detected contact state is transmitted (S33).

Of the downlink signals DS transmitted by the active pens 2b and 2d at S33, the downlink signal DS transmitted by the active pen 2b does not reach the sensor controller 31. This is because the active pen 2b is located in the zone B illustrated in FIG. 3. On the other hand, the downlink signal DS transmitted by the active pen 2d is received by the sensor controller 31.

The sensor controller 31, having received the downlink signal DS including the first identification data, extracts the first identification data from the downlink signal DS, and based on the frequency and time slot used to transmit the downlink signal DS, acquires the local pen ID of the active pen 2 corresponding to the transmission source (S34). Then, at the timing when the type 3 uplink signal US with the data type flag of "1" illustrated in FIG. 9C is next transmitted, the second identification data acquired based on the extracted first identification data is set as pairing data for the acquired local pen ID. Accordingly, the type 3 uplink signal US including the second identification data is transmitted (S40). In the description below, the content of the second identification data is assumed to be identical to the content of the first identification data extracted at S34.

The uplink signal US transmitted at S40 is received by both the active pens 2b and 2d as in the case of S31 (S41). The active pens 2b and 2d, having thus received the uplink signal US, compare the second identification data included in the uplink signal US with the last transmitted first identification data (S42), and performs transmission control of the next downlink signal according to the result of the comparison.

Specifically, the active pen 2 for which a match is found at S42 (in this case, the active pen 2d) repeats the process in S32 and the subsequent acts. This maintains pairing with the active pen 2d, and in a case where drawing is taking place, the drawing continues.

On the other hand, the active pen 2 for which a mismatch is found at S42 (in this case, the active pen 2b) performs a process for changing the pairing with the sensor controller 31 (S43). This process may be a process for temporarily canceling the pairing with the sensor controller 31, in other words, a process for deleting the local pen ID and communication configuration data stored at S16 in FIG. 8 and returning to an unpairing state, or a process for changing, in the memory of the active pen 2, the local pen ID stored at S16 in FIG. 8. In the latter case, it is preferable that the changed local pen ID can be notified from the active pen 2 to the sensor controller 31. Additionally, the process for changing the pairing may be a process for stopping transmission of the downlink signal DS.

After performing S43, it is sufficient that the active pen 2b waits for reception of the type 1 uplink signal US as usual. At this point in time, the active pen 2d is in the paired state, and thus, the active pen 2b performs pairing based on the type 1 uplink signal US received as a result of the wait, enabling pairing with the sensor controller 31 to be established at least without causing a conflict with the active pen 2d.

As described above, according to the position detecting system 1 according to the present embodiment, in a case where the two active pens 2 with the matched global pen ID or the matched hash value of the global pen ID are present near one touch surface 3t, one of the active pens 2 (specifically, the active pen 2 in the hover state) can be exclusively caused to cancel pairing. Accordingly, a conflict of pairing can be avoided without causing breakage of lines being drawn. Additionally, the detection accuracy for the position of the active pen 2 can be prevented from being reduced, and wasteful consumption of power for the active pen 2 can be prevented.

The preferred embodiments of the present disclosure have been described. However, the present disclosure is not limited to such embodiments, and needless to say, may be implemented in various manners without departing from spirits of the present disclosure.

For example, in the example described in each of the present embodiments, the pairing state information including six pieces of pairing data (pairing flag or second identification data) corresponding to respective local pen IDs of 1 to 6 is arranged in each uplink signal US. However, one uplink signal US may include only a part of the pairing state information such that uplink signals US including the pairing state information including six pieces of pairing data corresponding to respective local pen IDs of 1 to 6 are transmitted alternately with uplink signals US including the pairing state information including six pieces of pairing data corresponding to respective local pen IDs of 7 to 12. This method is particularly suitable for a case where the uplink signal US is transmitted a plurality of times within one frame (16.7 milliseconds), for example.

Additionally, both the pairing flag and the second identification data may be included in one uplink signal US. For example, the uplink signal US may be used in which three pieces of pairing data corresponding to the respective local pen IDs of 1 to 3 are the pairing flags, whereas three pieces of pairing data corresponding to the respective local pen IDs of 4 to 6 are the pieces of second identification data, or the uplink signal US may be used in which, in contrast, three pieces of pairing data corresponding to the respective local pen IDs of 1 to 3 are the pieces of second identification data, whereas three pieces of pairing data corresponding to the respective local pen IDs of 4 to 6 are the pairing flags.

Additionally, in the second embodiment described above, the first identification data is the contact state data. However, the first identification data can be configured using any other type of data as long as the data is intended to distinguish the active pens 2 from each other. For example, the pen pressure (for example, 256-level multilevel data) detected by the pen pressure detector 22 illustrated in FIG. 2 may be treated as the first identification data. Additionally, the following may be treated as the first identification data: data (operation state data) indicative of an operation state such as a depression state of the side switch provided on a housing of the active pen 2 or the tilt of the active pen 2 which operation state may have different values depending on how the human being grips the active pen 2; the data can be recognized by the sensor controller 31. Furthermore, in a case where the active pen 2 can internally generate housing-unique temporally varying data (time-varying data), the time-varying data may be treated as the first identification data.

Additionally, in the second embodiment described above, the first identification data and the second identification data have identical contents. However, the contents of the first and second identification data need not necessarily be identical, and, for example, the second identification data may be configured using statistical data of last few first identification data. In this case, the active pen 2 having received the second identification data may acquire the statistical data of the last few first identification data transmitted by the active pen at S42 illustrated in FIG. 10 and compare the statistical data with the second identification data.

Additionally, in the second embodiment, the last transmitted first identification data is to be compared at S42. However, the first identification data may be newly acquired again immediately before S42 (that is, the contact state may newly be detected), and the first identification data acquired as a result may be used for comparison at S42.

What is claimed is:

1. An active pen communicating with a sensor controller connected to a sensor electrode, the active pen comprising:
   a pen tip electrode; and
   an integrated circuit connected to the pen tip electrode,
   wherein the integrated circuit, in operation,
      transmits a downlink signal including first contact state data indicating whether a pen tip of the active pen is in contact with a touch surface,
      receives an uplink signal including second contact state data,
      compares the first contact state data included in the downlink signal with the second contact state data included in the uplink signal, and
      cancels a pairing state of the active pen based on a result of comparing the first contact state data included in the downlink signal with the second contact state data included in the uplink signal.

2. The active pen according to claim 1,
wherein the active pen, in operation, receives the uplink signal including the second contact state data via capacitive coupling between the pen tip electrode and the sensor electrode.

3. The active pen according to claim 1,
wherein the integrated circuit, in operation, cancels the pairing state of the active pen in a case where the first contact state data included in the downlink signal and the second contact state data included in the uplink signal do not match.

4. A communication method performed between an active pen and a sensor controller, the communication method comprising:
   causing the active pen to transmit a downlink signal including first identification data indicating a first contact state regarding whether a pen tip of the active pen is in contact with a touch surface after the active pen has been paired with the sensor controller;
   causing the sensor controller to receive the downlink signal including the first identification data and transmit an uplink signal including second identification data acquired based on the first identification data included in the downlink signal that is received, the second identification data indicating a second contact state; and
   causing the active pen to receive the uplink signal including the second identification data, compare the second identification data with the first identification data, and cancel transmission of a next downlink signal depending on a result of comparing the second identification data with the first identification data.

5. The communication method according to claim 4,
wherein, in a case where, as the result of comparing the second identification data with the first identification data, the active pen determines that the second identification data matches the first identification data, the active pen transmits the next downlink signal including the first identification data, and
in a case where, as the result of comparing the second identification data with the first identification data, the active pen determines that the second identification data does not match the first identification data, the active pen performs a process that changes pairing with the sensor controller.

6. A communication method performed among a first active pen, a second active pen, and a sensor controller, the communication method comprising:
   causing the first active pen to transmit a first downlink signal including first identification data indicating a first contact state regarding whether a pen tip of the first active pen is in contact with a touch surface after the first active pen has been paired with the sensor controller;
   causing the second active pen to transmit a second downlink signal including second identification data indicating a second contact state regarding whether a pen tip of the second active pen is in contact with the touch surface after the second active pen has been paired with the sensor controller;
   causing the sensor controller to receive the first downlink signal including the first identification data indicating the first contact state;
   causing the sensor controller to receive the second downlink signal including the second identification data indicating the second contact state;
   causing the sensor controller to transmit an uplink signal including the first identification data indicating the first contact state or the second identification data indicating the second contact state;
   causing the first active pen to compare the first identification data included in the first downlink signal with the first identification data indicating the first contact state or the second identification data indicating the second contact state included in the uplink signal;
   causing the second active pen to compare the second identification data included in the second downlink signal with the first identification data indicating the first contact state or the second identification data indicating the second contact state included in the uplink signal; and
   wherein in a case where the first active pen determines that the first identification data included in the first downlink signal does not match the first identification data indicating the first contact state or the second identification data indicating the second contact state included in the uplink signal based on a result of comparing the first identification data included in the first downlink signal with the first identification data indicating the first contact state or the second identification data indicating the second contact state included in the uplink signal, causing the first active pen to cancel pairing with the sensor controller.

7. The communication method according to claim 6, further comprising:
   wherein in the case where the first active pen determines that the first identification data included in the first downlink signal does not match the first identification data indicating the first contact state or the second identification data indicating the second contact state included in the uplink signal based on the result of comparing the first identification data included in the first downlink signal with the first identification data indicating the first contact state or the second identification data indicating the second contact state included in the uplink signal, causing the first active pen to change a local pen identifier (ID) of the first active pen.

8. The communication method according to claim 7, further comprising:
   wherein in the case where the first active pen determines that the first identification data included in the first downlink signal does not match the first identification data indicating the first contact state or the second identification data indicating the second contact state included in the uplink signal based on the result of comparing the first identification data included in the first downlink signal with the first identification data indicating the first contact state or the second identification data indicating the second contact state included in the uplink signal, causing the first active pen to notify the local pen ID of the first active pen to the sensor controller after the local pen ID of the first active pen is changed.

9. The communication method according to claim 6, further comprising:
   wherein in the case where the first active pen determines that the first identification data included in the first downlink signal does not match the first identification data indicating the first contact state or the second identification data indicating the second contact state included in the uplink signal based on the result of comparing the first identification data included in the first downlink signal with the first identification data indicating the first contact state or the second identification data indicating the second contact state included in the uplink signal, causing the first active pen to stop the transmission of the first downlink signal.

10. The communication method according to claim 6, wherein in a case where the first active pen determines that the first identification data included in the first downlink signal matches the first identification data indicating the first contact state or the second identification data indicating the second contact state included in the uplink signal based on the result of comparing the first identification data included in the first downlink signal with the first identification data indicating the first contact state or the second identification data indicating the second contact state included in the uplink signal, causing the first active pen to maintain pairing with the sensor controller.

\* \* \* \* \*